US012535555B2

(12) United States Patent
Johannes

(10) Patent No.: US 12,535,555 B2
(45) Date of Patent: Jan. 27, 2026

(54) MEASUREMENT ARRANGEMENT

(71) Applicant: Siemens Mobility GmbH, Munich (DE)

(72) Inventor: Lars Johannes, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 622 days.

(21) Appl. No.: 17/943,383

(22) Filed: Sep. 13, 2022

(65) Prior Publication Data

US 2023/0084387 A1  Mar. 16, 2023

(30) Foreign Application Priority Data

Sep. 13, 2021  (EP) ................................ 21196339

(51) Int. Cl.
*G01S 5/02* (2010.01)

(52) U.S. Cl.
CPC .......... *G01S 5/0294* (2013.01); *G01S 5/0284* (2013.01)

(58) Field of Classification Search
CPC .. G01S 5/0294; G01S 5/0284; B61L 2205/04; B61L 25/025
See application file for complete search history.

(56) References Cited

U.S. PATENT DOCUMENTS 9,513,374 B2 * 12/2016 Deshpande ............. G01S 19/49
9,702,742 B2 * 7/2017 Reimann ................. G01D 21/00
10,247,576 B2 4/2019 Heide et al.

FOREIGN PATENT DOCUMENTS

DE  102005046456 A1 *  3/2007 ........... B61L 25/021
KR  20170005912 A *  1/2017
WO  2013020739 A1  2/2013
WO  2015189140 A1  12/2015

OTHER PUBLICATIONS

Vetterli, Marc, "How smarttrail 4.0 increases rail efficiency"—Eurailpress, Bahn Manager. Internet: https://www.eurailpress.de/bahn-manager/detail/news/wie-mit-smarttrail-40-die-effizienz-der-bahn-erhoeht-wird.html—English version.

* cited by examiner

*Primary Examiner* — Robert W Hodge
*Assistant Examiner* — Bongani Jabulani Mashele
(74) *Attorney, Agent, or Firm* — Laurence A. Greenberg; Werner H. Stemer; Ralph E. Locher

(57) ABSTRACT

A measurement arrangement has a first satellite-based measurement facility, which works on the basis of signals of a first global satellite positioning system, for generating a first measured value, which indicates a location or a speed of the first measurement facility, and a measured value-based first accuracy value indicating the accuracy of the first measured value. A second satellite-based measurement facility is present, which works on the basis of signals of a second, different global satellite positioning system and serves for generating a second measured value, which indicates the location or the speed of the second measurement facility, and a second measured value-based accuracy value, which indicates the accuracy of the second measured value. The first and second satellite-based measurement facilities are connected to an evaluation facility, which carries out a plausibility check using the measured values and generates an error signal if the plausibility check delivers an implausible result.

14 Claims, 3 Drawing Sheets

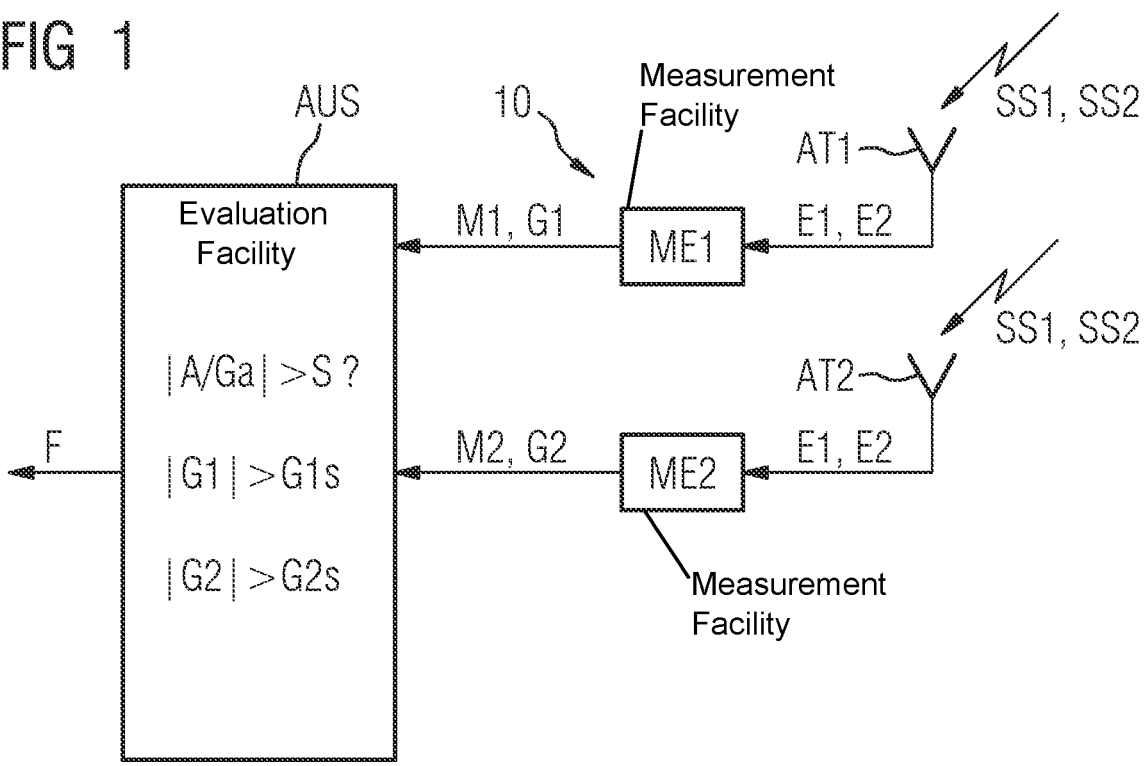
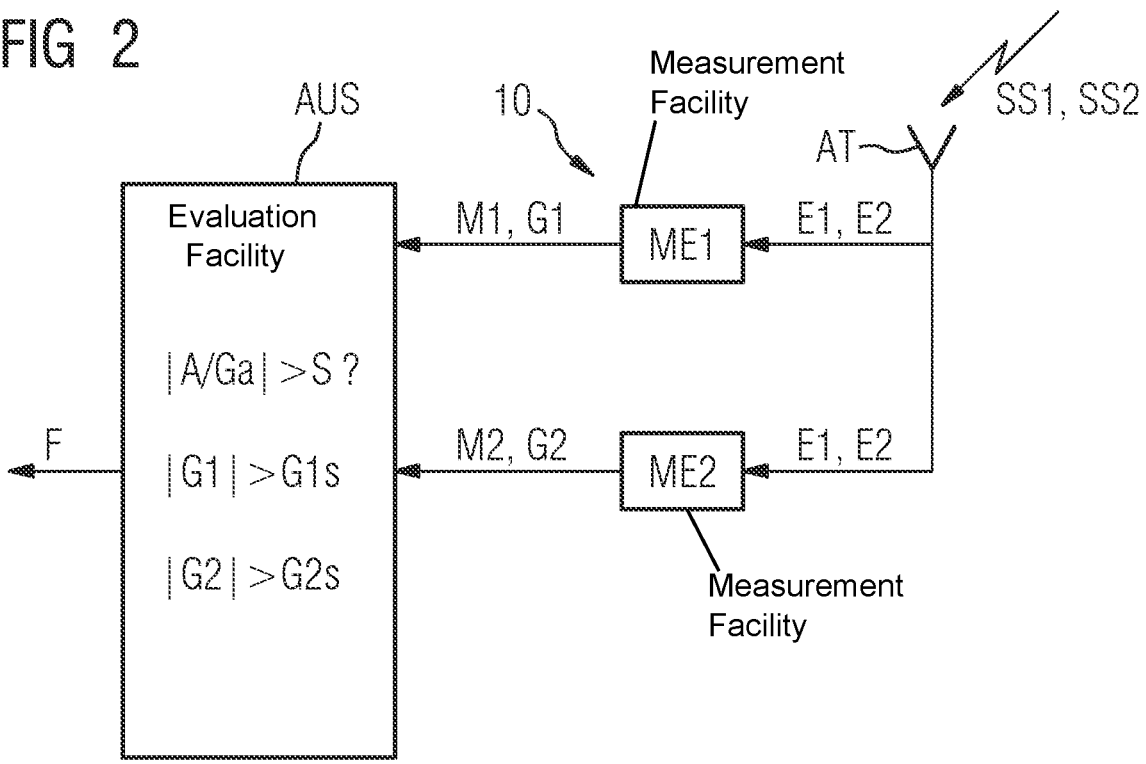

MEASUREMENT ARRANGEMENT

CROSS-REFERENCE TO RELATED APPLICATION

This application claims the priority, under 35 U.S.C. § 119, of European Patent Application EP21196339.2, filed Sep. 13, 2021; the prior application is herewith incorporated by reference in its entirety.

FIELD AND BACKGROUND OF THE INVENTION

The invention relates to measurement arrangements, which are fitted with satellite-based measurement facilities.

As is known, satellite-based measurement facilities are capable of delivering relatively accurate measured values in respect of the location and the speed, for example of a vehicle. For this reason, measurement facilities of this kind are currently also used in the private sector, for example in private cars. The commercially available satellite-based measurement facilities are conventionally capable of indicating both a measured value, which indicates a location and/or the speed of the measurement facility, as well as measured value-based accuracy value indicating the accuracy of the respective measured value.

When used in railway engineering there is the problem that with a view to the high compulsory safety standards, accurate knowledge of the respective location and the respective speed of the rail vehicles is to be ensured at every instant. The problem in this connection is that the satellite signals, which are evaluated by the satellite-based measurement facilities, can be manipulated by terrestrial attackers by what is known as spoofing and the measurement facilities output falsified measured values in such a case. Such a measured value falsification would be able to have fatal consequences in the railroad sector so the object is posed of configuring measurement arrangements, which are based on satellite-based measurement facilities, to be especially tamper-proof with regard to safe operation, precisely also with a view to the high requirements in the railroad sector.

SUMMARY OF THE INVENTION

This object is inventively achieved by a measurement arrangement with the features in accordance with the independent claim. Advantageous embodiments of the inventive measurement arrangement are disclosed in subclaims.

With the foregoing and other objects in view there is provided, in accordance with the invention, a measurement configuration. The measurement configuration contains measurement facilities, including: a first satellite-based measurement facility, working on a basis of signals of a first global satellite positioning system, for generating a first measured value indicating a location or a speed of the first satellite-based measurement facility, and a first measured value-based accuracy value indicating an accuracy of the first measured value; and at least one second satellite-based measurement facility, working on a basis of signals of a second, different global satellite positioning system and serves for generating a second measured value indicating a location or a speed of the second satellite-based measurement facility, and a second measured value-based accuracy value indicating an accuracy of the second measured value. An evaluation facility is connected to the first and second satellite-based measurement facilities and carries out a plausibility check using the first and second measured values and/or the first and second measured value-based accuracy values of the first and second satellite-based measurement facilities and generates an error signal if the plausibility check delivers an implausible result and is regarded as failed.

Accordingly, it is inventively provided that in addition to a first satellite-based measurement facility, which works on the basis of signals of a first global satellite positioning system, at least one second satellite-based measurement facility is present, which works on the basis of signals of a second, different global satellite positioning system, and the first and second satellite-based measurement facilities are connected to an evaluation facility, which carries out a plausibility check using the measured values and/or the measured value-based accuracy values of the measurement facilities and generates an error signal if the plausibility check delivers an implausible result and is regarded as failed.

The inventive measurement arrangement advantageously does not work solely on the basis of a single satellite-based measurement facility therefore, but on the basis of at least two satellite-based measurement facilities, which use different global satellite positioning systems. If one of the measurement facilities is disrupted by external interference, for example by what is known as spoofing of the satellite signals, this can be established by way of the inventive plausibility check. If a plausibility problem is established, the error signal is generated and predefined safety measures can be taken, which take account of the fact of missing plausibility.

It is advantageous if the evaluation facility is configured to form a deviation value, which quantifies the deviation between the measured values among themselves or the deviation from an estimated measured value (estimated value), which has been estimated on the basis of at least one of the measured values, to form an accuracy value indicating the accuracy of the deviation value, hereinafter referred to as the deviation value-based accuracy value, and to generate the error signal using the deviation value and the deviation value-based accuracy value.

With the last-mentioned variant it is particularly advantageous if the evaluation facility regards the plausibility check as failed and generates the error signal if the amount of the quotient between the deviation value and the deviation value-based accuracy value attains or overshoots a deviation value-based limit value.

Alternatively or in addition, the evaluation facility can regard the plausibility check as failed and generate the error signal if the first measured value-based accuracy value attains or overshoots a first measured value-based limit value, the second measured value-based accuracy value attains or overshoots a second measured value-based limit value or both measured value-based accuracy values attain or overshoot their respective measured value-based limit value.

Preferably, one or more further measurement facilities are present, which in each case serve for generating a further measured value, which indicates the location or the speed of the respective measurement facility, and a further measured value-based accuracy value, which indicates the accuracy of the further measured value. The further measurement facilities or at least one of these facilities is preferably, a further satellite-based measurement facility.

With the last-mentioned variant it is advantageous if the evaluation facility is configured to form per pair of measurement facilities in each case one deviation value individual to the pair, which quantifies the deviation between the measured values of the measurement facilities of the respective pair, to form pro pair of measurement facilities an accuracy value, individual to the pair, indicating the accuracy of the deviation value individual to the pair, and to generate the error signal using the deviation values individual to the pair and the accuracy values individual to the pair.

It is advantageous if the evaluation facility regards the plausibility check as failed and generates the error signal if in the case of at least one pair the amount of the quotient between the deviation value individual to the pair and the accuracy value individual to the pair attains or overshoots a deviation value-based limit value individual to the pair or a system-wide deviation value-based limit value.

Alternatively or in addition, it can advantageously be provided that the evaluation facility is configured to form a deviation value, which quantifies the deviation of the measured values of the satellite-based measurement facilities from an estimated measured value (or estimated value), which has been estimated on the basis of the measured values of all satellite-based measurement facilities of the measurement arrangement, to form an accuracy value indicating the accuracy of the deviation values, hereinafter referred to as the deviation value-based accuracy value, and to generate the error signal using the deviation value and the deviation value-based accuracy value.

The measurement facilities are preferably connected to the same antenna and use this jointly; alternatively, individual or all measurement facilities can also use individual antennas.

With a view to low costs it is regarded as advantageous if the measurement arrangement has a computing facility and a memory. Software is preferably stored in the memory, and defines the mode of operation of the computing facility when it is executed by the computing facility. The evaluation facility and the measurement facilities are preferably formed by software program modules of the software.

The distance between the measurement facilities is preferably taken into account when calculating the deviation values in that the deviation values are corrected by taking into account the distances.

The invention is based, moreover, on a vehicle, in particular a rail vehicle. It is inventively provided in this regard that the vehicle is fitted with a measurement arrangement as described above.

In respect of the advantages of the inventive vehicle and advantageous embodiments of the inventive vehicle, reference should be made to the above statements in connection with the inventive measurement arrangement and its advantageous embodiments.

It is particularly advantageous if the vehicle has a vehicle control device, which, when the error signal is present, checks whether the speed of the vehicle has to be reduced or the vehicle has to be stopped, and/or when the error signal is present, reduces the speed of the vehicle immediately or stops the vehicle immediately.

The invention relates, moreover, to a method for generating a first measured value, which indicates a location or a speed, and a measured value-based first accuracy value indicating the accuracy of the first measured value, with the aid of a first satellite-based measurement facility, which works on the basis of signals of a first global satellite positioning system.

In respect of the method it is inventively provided that with a second satellite-based measurement facility, which works on the basis of signals a second, different global satellite positioning system, a second measured value, which likewise indicates the location or the speed, and a second measured value-based accuracy value, which indicates the accuracy of the second measured value, are generated and a plausibility check is carried out and an error signal is generated if the plausibility check delivers an implausible result and is regarded as failed.

In respect of the advantages of the inventive method and advantageous embodiments of the inventive method, reference should be made to the above statements in connection with the inventive measurement arrangement and its advantageous embodiments.

Other features which are considered as characteristic for the invention are set forth in the appended claims.

Although the invention is illustrated and described herein as embodied in a measurement arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 is a block diagram showing an exemplary embodiment of an inventive measurement arrangement, which is fitted with two satellite-based measurement facilities, a separate antenna in each case being assigned to the measurement facilities and according to the invention;

FIG. 2 is a block diagram showing an exemplary embodiment of an inventive measurement arrangement, which is fitted with two satellite-based measurement facilities, the measurement facilities in each case being connected to the same antenna;

DETAILED DESCRIPTION OF THE INVENTION

Figure 3:
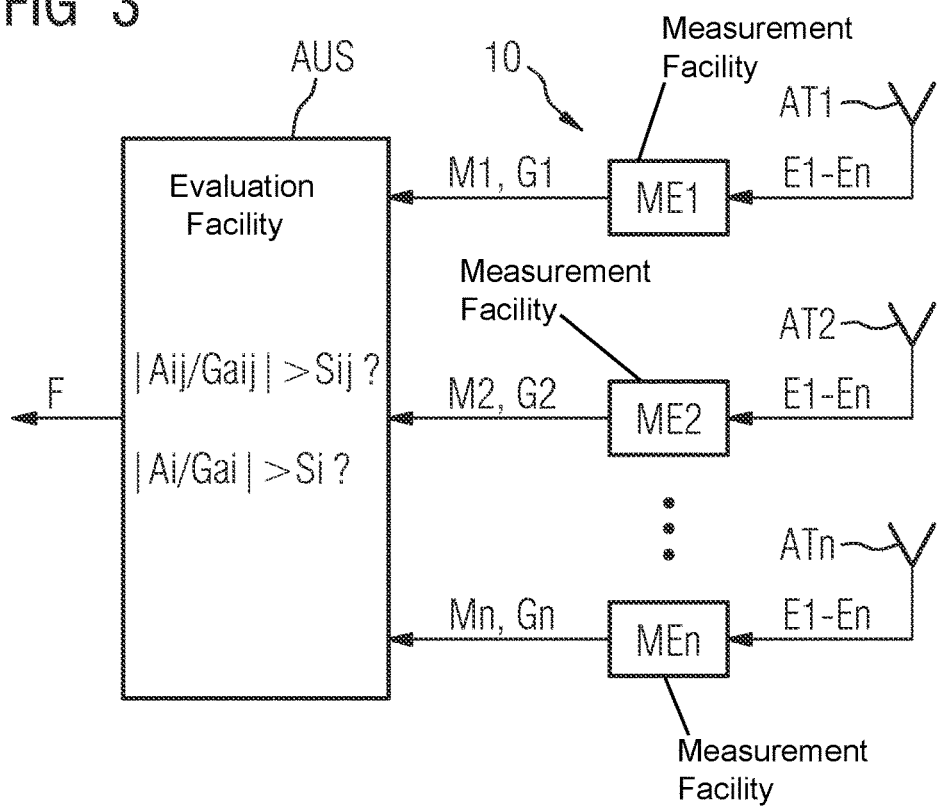
FIG. 3 is a block diagram showing an exemplary embodiment of an inventive measurement arrangement, which is fitted with a plurality of satellite-based measurement facilities, the measurement facilities in each case being connected to a separate antenna.

For the sake of clarity the same reference numerals will always be used in the figures for identical or comparable components.

Referring now to the figures of the drawings in detail and first, particularly to FIG. 1 thereof, there is shown a first exemplary embodiment of a measurement arrangement 10, which is fitted with a first satellite-based measurement facility ME1 and a second satellite-based measurement facility ME2. The first satellite-based measurement facility ME1 works on the basis of signals SS1 of a first global satellite positioning system and the second satellite-based measurement facility ME2 on the basis of signals SS2 of a second global satellite positioning system. The two measurement facilities ME1 and ME2 are connected to individually assigned antennas AT1 or AT2, which in each case send receive signals E1 and E2, corresponding to the signals SS1 and SS2, to their measurement facilities ME1 or ME2.

The first satellite-based measurement facility ME1 can work for example on the basis of the GPS satellite positioning system and the second satellite-based measurement facility ME2 on the basis of signals of the Galileo satellite positioning system.

The first satellite-based measurement facility ME1 evaluates the receive signals E1 of its antenna AT1 and generates a first measured value M1, which indicates the location or the speed of the measurement facility ME1, and a measured value-based first accuracy value G1 indicating the accuracy of the first measured value ME1.

The second satellite-based measurement facility ME2 evaluates the receive signals E2 of its antenna AT2 and generates a second measured value M2, which indicates the location or the speed of the second measurement facility ME2, and a measured value-based second accuracy value G2 indicating the accuracy of the second measured value ME.

The accuracy values G1 and G2 define for the measured values M1 and M2 in each case range limits within which the actual location or the actual speed will be located with a predefined probability; with very accurate measured values the accuracy values G1 and G2 are thus smaller than with comparably less accurate measured values, because in the last-mentioned case the range limits lie further away from the measured values than with more accurate measured values. With an absolutely accurate, in other words, error-free, measured value the accuracy values G1 and G2 would be zero, therefore. With increasing possible measurement errors, the accuracy values G1 and G2 increase accordingly. The accuracy values could therefore also be referred to as error range values or as "inaccuracy values" because with an increasing amount they describe increasing inaccuracy.

Commercially available satellite-based measurement facilities conventionally co-deliver accuracy values of the described type, so reference shall be made in this regard to the specialist literature.

Since the two measurement facilities ME1 and ME2 form part of the same measurement arrangement 10 and are installed for example in the same vehicle, the measured values M1 and M2 should be at least approximately similar.

Arranged downstream of the two measurement facilities ME1 and ME2 is an evaluation facility AUS, which carries out a plausibility check using the measured values M1 and M2 and the measured value-based accuracy values G1 and G2 of the two measurement facilities ME1 and ME2.

The plausibility check preferably comprises forming a deviation value A, which quantifies the deviation between the measured values M1 and M2, preferably in accordance with:

$$A=|M1-M2|$$

The measured values M1 and M2 will, as a rule, be vectorial measured values M or measured value vectors, which indicate the location or the speed for three spatial coordinates, for example Cartesian x-, y- and z-coordinates. The deviation value A is then preferably formed in accordance with:

$$A = \sqrt[2]{(Mx1 - Mx2)^2 + (My1 - My2)^2 + (Mz1 - Mz2)^2}$$

where Mx1, My1, and Mz1 designate the x-, y- and z-coordinate portions of the vectorial measured value M1 and Mx2, My2, and Mz2 the x-, y- and z-coordinate portions of the vectorial measured value M2.

For the deviation value A an accuracy value Ga indicating the accuracy of the deviation values A, hereinafter referred to as the deviation value-based accuracy value Ga, is ascertained.

The deviation value-based accuracy value Ga defines for the deviation value A in each case a range limit or a range within which the actual deviation value A will be located with a predefined probability; with a very accurate deviation value the deviation value-based accuracy value Ga is thus smaller than with a comparably less accurate accuracy value because in the last-mentioned case the range limits lie further away from the deviation value A than with a more accurate deviation value. With an absolutely accurate, in other words error-free, deviation value A, the accuracy value Ga would be zero, therefore; with increasing possible error of the deviation value A or with increasing inaccuracy, the accuracy value Ga increases accordingly.

With the deviation value-based accuracy value Ga a quotient Q can then be formed and this quotient Q subjected to a threshold value comparison, preferably in accordance with:

$$Q=|A/Ga|>S \Rightarrow F$$

If the quotient Q overshoots a predefined threshold value S, the measurement results are categorized as implausible and an error signal F is generated, which shows the failure of the plausibility test. The quotient Q will overshoot the threshold value if the deviation value between the measured values M1 and M2 is implausibly large with a small deviation value-based accuracy value Ga (with a high level of accuracy or reliability of the deviation values, therefore).

The deviation value-based accuracy value Ga can be ascertained as a function of the measured value-based accuracy values G1 and G2 or by an estimation on the basis of the measured value-based accuracy values G1 and G2. Averaging only of the measured value-based accuracy values G1 and G2 is also possible, for example in accordance with:

$$Ga=G1-(G1-G2)/2$$

Alternatively or in addition, the evaluation facility AUS can regard the plausibility check as failed and generate the error signal F if the first measured value-based accuracy value G1 attains or overshoots a first measured value-based accuracy limit value G1s, the second measured value-based accuracy value G2 attains or overshoots a second measured value-based accuracy limit value G2s or both measured value-based accuracy values G1 and G2 attain or overshoot their respective measured value-based accuracy limit values, for example in accordance with:

$$G1>G1s \Rightarrow F$$

$$G2>G2s \Rightarrow F$$

Alternatively, the evaluation facility AUS can estimate the deviation value A by means of an estimation procedure SV, preferably at least also on the basis of the measured values M1 and M2 of the measurement facilities ME1 and ME2, for example in accordance with:

$$A=SV(M1;M2)$$

Further parameters and/or other measurement results from other sources can also be incorporated in the estimation procedure SV. The integrated measured values, parameters or other measurement results can also be taken into account weighted if their quality or significance is to be assessed differently.

The estimation procedure SV can be based, for example, on a prediction method and use Kalman filters, for example.

For the estimated deviation value, the evaluation facility AUS will preferably estimate the deviation value-based accuracy value Ga by means of a further estimation procedure SV2, for example in accordance with:

$$Ga=SV2(G1;G2)$$

Further parameters and/or other measurement results from other sources can also be incorporated in the further estimation procedure SV2. The further estimation procedure SV2 can be based on a prediction method and use Kalman filters, for example.

FIG. 2 shows as a second exemplary embodiment a variant of the first exemplary embodiment in accordance with FIG. 1. In contrast to the exemplary embodiment in accordance with FIG. 1, the two satellite-based measurement facilities ME1 and ME2 are connected to the same antenna AT and evaluate the receive signals of the same antenna AT.

The above statements in connection with FIG. 1 apply in the case of the second exemplary embodiment in accordance with FIG. 1 accordingly, moreover.

FIG. 3 shows a third exemplary embodiment for a measurement arrangement 10, which is fitted with three or more satellite-based measurement facilities ME1 to MEn (n>2). The satellite-based measurement facilities ME1 to MEn in each case work on the basis of signals of an assigned global satellite positioning system and evaluate the corresponding receive signals E1-En in this regard.

Arranged downstream of the measurement facilities ME1 to MEn is an evaluation facility AUS, which carries out a pair-based plausibility check using the measured values M1 to Mn and the measured value-based accuracy values G1 to Gn of the measurement facilities ME1 to MEn.

Specifically, the evaluation facility AUS is preferably designed to form per pair of measurement facilities Mi/Mj (i≠j) in each case a deviation value Aij individual to the pair, which quantifies the deviation between the measured values Mi and Mj of the measurement facilities of the respective pair:

$$Aij=|Mi-Mj| \text{ where } i,j=1 \ldots n \text{ and } i \neq j$$

Furthermore, the evaluation facility AUS forms per pair of measurement facilities an accuracy value Gaij, individual to the pair, indicating the accuracy of the deviation value Aij individual to the pair. The accuracy values Gaij individual to the pair can be formed for example in exactly the same way as was illustrated in connection with FIG. 1 for the deviation value-based accuracy value Ga for the two measurement facilities ME1 and ME2.

With the pair-wise deviation value Aij and the accuracy value Gaij individual to the pair, a quotient Qij individual to the pair can then be formed and this quotient Qij subjected to a threshold value comparison, preferably in accordance with:

$$Qij=|Aij/Gaij|>Sij \Rightarrow F$$

If the quotient Qij exceeds a predefined threshold value, for example threshold value Sij individual to the pair, the measurement results Mi and Mj will be classified as implausible and an error signal F will be generated, which shows the failure of the plausibility test.

Alternatively or in addition, the evaluation facility AUS can form one deviation value Ai per $i^{th}$ measurement facility MEi, which quantifies the deviation of the measured values Mi of the respective $i^{th}$ measurement facility MEi from an estimated system-based measured value Msys, which has preferably been estimated on the basis of the measured values M1-Mn of all satellite-based measurement facilities ME1 to MEn of the measurement arrangement 10.

The system-based measured value Msys is estimated, for example, by means of an estimation procedure SV3, for example in accordance with:

$$Msys=SV3(M1;\ldots;Mn) \text{ where } i=1 \ldots n$$

Further parameters and/or other measurement results from other sources can also be incorporated in the estimation procedure SV3. The integrated measured values M1 to Mn, parameters or other measurement results can also be taken into account weighted if their quality or significance is to be evaluated differently.

The estimation procedure SV3 can be based, for example, on a prediction method and use Kalman filters, for example.

The deviation values Ai are preferably calculated as follows:

$$Ai=|Mi-Msys|$$

In addition, for each of the deviation values Ai the evaluation facility AUS will form an accuracy value Gai indicating the accuracy of the respective deviation value Ai, hereinafter referred to as deviation value-based accuracy value Gai.

The deviation value-based accuracy value Gai can be estimated by means of an estimation procedure SV4, preferably at least also on the basis of the accuracy values Gi of the measurement facilities ME1 to MEn, for example in accordance with:

$$Gai=SV4(Ai,G1,\ldots,Gn) \text{ where } i=1 \ldots n$$

Further parameters and/or other measurement results from other sources can also be incorporated in the estimation procedure SV4. The considered accuracy values G1 to Gn, parameters or other measurement results can also be integrated in a weighted manner if their quality or significance is to be evaluated differently.

The estimation procedure SV4 can be based, for example, on a prediction method and use Kalman filters, for example.

With the deviation values Ai and the deviation value-based accuracy value Gai, in each case a quotient Qi can then be formed and this quotient Qi subjected to a threshold value comparison, preferably in accordance with:

$$Qi=|Ai/Gai|>Si \Rightarrow F$$

If the quotient Qi overshoots a predefined threshold value, for example measurement facility-based threshold value Si, the measurement results will be classified as implausible and an error signal F will be generated, which shows the failure of the plausibility test.

Figure 4:
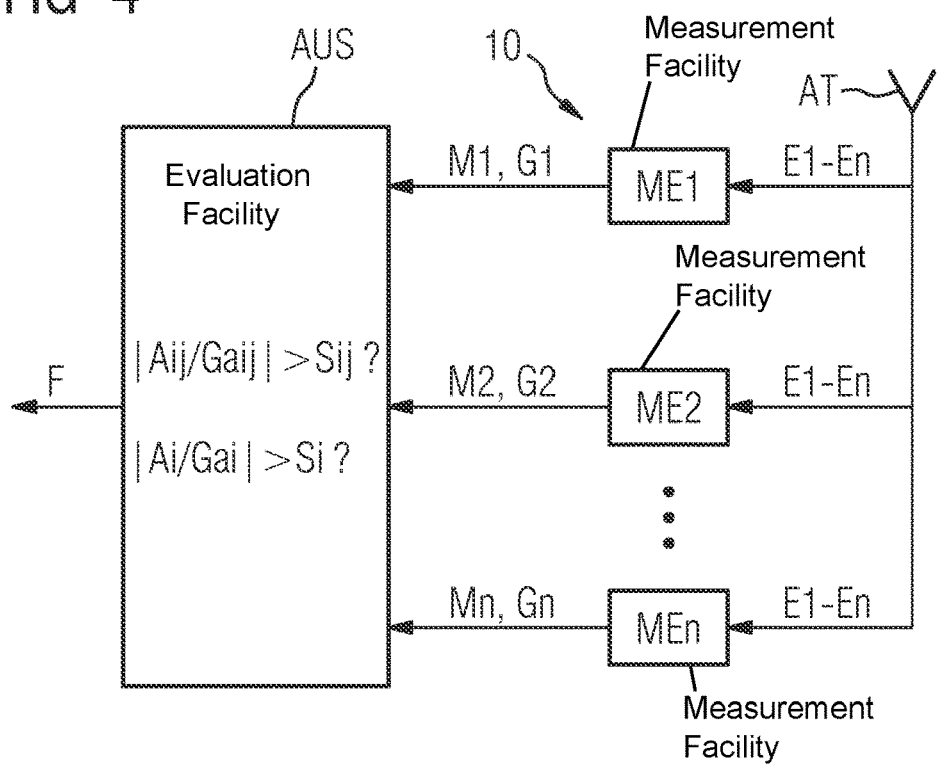
FIG. 4 is a block diagram showing an exemplary embodiment of an inventive measurement arrangement, which is fitted with a plurality of satellite-based measurement facilities, the measurement facilities in each case being connected to the same antenna.

FIG. 4 shows as a fourth exemplary embodiment a variant of the third exemplary embodiment in accordance with FIG. 3. In contrast to the exemplary embodiment in accordance with FIG. 3, the satellite-based measurement facilities ME1 to MEn are connected to the same antenna AT and evaluate the receive signals of the same antenna AT.

The above statements in connection with FIG. 3 apply in the case of the second exemplary embodiment in accordance with FIG. 4 accordingly, moreover.

Three or more satellite-based measurement facilities are present in the exemplary embodiments in accordance with FIGS. 3 and 4; alternatively, also just two measurement facilities (for example ME1 and ME2) can be satellite-based and the further measurement facilities (ME3-MEn) can be based on other known measuring mechanisms (for example odometers, etc.). The above statements in connection with a deviation- and accuracy-based plausibility check in the case of three or more satellite-based measurement facilities apply accordingly to those designs with two satellite-based measurement facilities and further measurement facilities that work in a different manner.

Figure 5:
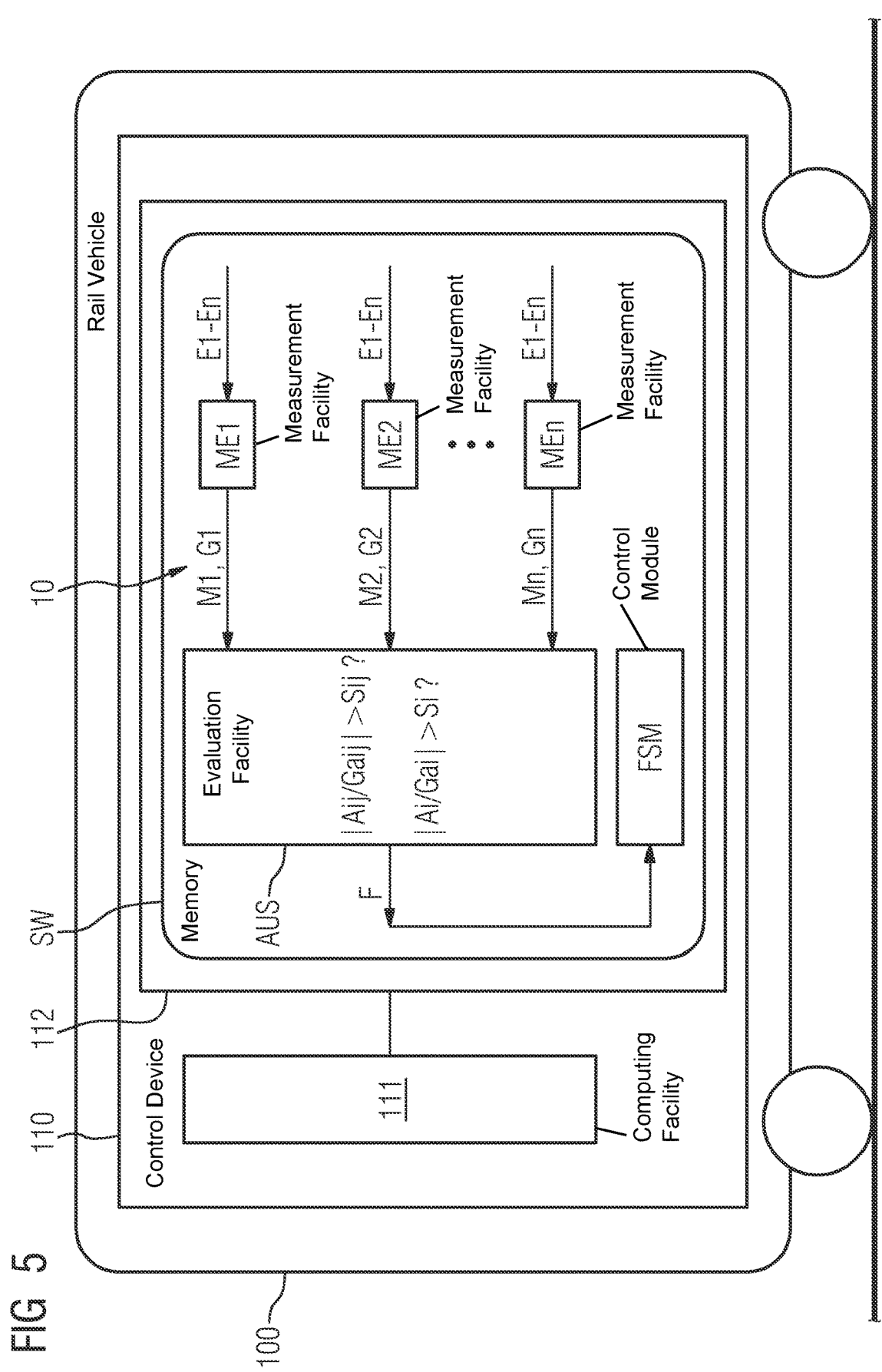
FIG. 5 is a block diagram showing an exemplary embodiment of an inventive rail vehicle, which is fitted with an exemplary embodiment of an inventive measurement arrangement.

FIG. 5 shows as a fifth exemplary embodiment a rail vehicle 100, which is fitted with a measurement arrangement 10, for example one as has been described above in connection with FIGS. 1 to 4.

The measurement arrangement 10 is integrated in a vehicle control device 110 of the rail vehicle 100 and serves to measure the location and/or the speed of the rail vehicle 100 on the basis of signals from at least two global satellite positioning systems.

The vehicle control device 110 and therewith also the measurement arrangement 10 are formed by a computing facility 111 and a memory 112 in which software SW is stored. When executed by the computing facility 111 the software establishes the mode of operation of the computing facility 111 and therewith of the measurement arrangement 10 or of the vehicle control device 110 as a whole.

The evaluation facility AUS and the measurement facilities ME-MEn, which have been described in connection with FIGS. 1 to 4, are formed by software program modules of the software SW in the exemplary embodiment in accordance with FIG. 5.

The vehicle control device 110 or the computing facility 11 checks the plausibility of the measured values M1-Mn and generates an error signal F in the case of missing plausibility. When the error signal F is present, a vehicle control module FSM likewise implemented in the software preferably also checks whether the speed of the vehicle has to be reduced or the vehicle stopped even.

Although the invention has been illustrated and described in detail by preferred exemplary embodiments, the invention is not limited by the disclosed examples and a person skilled in the art can derive other variations herefrom without departing from the scope of the invention.

The following is a summary list of reference numerals and the corresponding structure used in the above description of the invention:

10 measurement arrangement
100 rail vehicle
110 vehicle control device
111 computing facility
112 memory
A deviation value
AT antenna
AUS evaluation facility
E receive signal
F error signal
FSM vehicle control module
G accuracy value
Ga deviation value-based accuracy value
G1s measured value-based accuracy limit value
G2s measured value-based accuracy limit value
i counter variable
j counter variable
M measured value
ME measurement facility
Msys system-based measured value
n counter variable
S threshold value
SS satellite signal
SV estimation procedure
SW software

The invention claimed is:

1. A measurement configuration, comprising:
measurement facilities, including:
a first satellite-based measurement facility, working on a basis of signals of a first global satellite positioning system, for generating a first measured value indicating a location or a speed of said first satellite-based measurement facility, and a first measured value-based accuracy value indicating an accuracy of the first measured value;
at least one second satellite-based measurement facility, working on a basis of signals of a second, different global satellite positioning system and serves for generating a second measured value indicating a location or a speed of the second satellite-based measurement facility, and a second measured value-based accuracy value indicating an accuracy of the second measured value;
at least one third measurement facility, which in each case serve for generating a third measured value, indicating a location or a speed of said at least one third measurement facility, and a third measured value-based accuracy value indicating an accuracy of the third measured value;
an evaluation facility connected to said first and second satellite-based measurement facilities and carrying out a plausibility check using the first and second measured values and/or the first and second measured value-based accuracy values of said first and second satellite-based measurement facilities and generating an error signal if the plausibility check delivers an implausible result and is regarded as failed; and
said evaluation facility configured to form a deviation value, which quantifies a deviation of the measured values of said measurement facilities from an estimated measured value, which said estimated measured value being estimated on a basis of the measured values of said measurement facilities of the measurement configuration, to form an accuracy value indicating an accuracy of deviation values, hereinafter referred to as a deviation value-based accuracy value, and to generate the error signal further from the deviation values and the deviation value-based accuracy value.

2. The measurement configuration according to claim 1, wherein said evaluation facility is configured to form a further deviation value, which quantifies a deviation between the first and second measured values among themselves or a deviation from a further estimated measured value, which has been estimated on a basis of at least one of the first and second measured values, to form a further deviation value-based accuracy value indicating an accuracy of the further deviation value, and to generate the error signal using the further deviation value and the further deviation value-based accuracy value.

3. The measurement configuration according to claim 2, wherein said evaluation facility regards the plausibility check as failed and generates the error signal if an amount of a quotient between the further deviation value and the further deviation value-based accuracy value attains or overshoots a deviation value-based limit value.

4. The measurement configuration according to claim 1, wherein said evaluation facility regards the plausibility check as failed and generates the error signal if the first measured value-based accuracy value attains or overshoots a first measured value-based limit value, the second measured value-based accuracy value attains or overshoots a second measured value-based limit value or both the first and second measured value-based accuracy values attain or overshoot their respective measured value-based limit value.

5. The measurement configuration according to claim 1, wherein:
said evaluation facility is configured to form per pair of said measurement facilities in each case one deviation value individual to said pair, which quantifies a deviation between the measured values of said measurement facilities of a respective said pair;
said evaluation facility is configured to form per said pair of said measurement facilities an accuracy value, individual to said pair, indicating the accuracy of the deviation value individual to said pair; and
said evaluation facility is configured to generate the error signal using deviation values individual to said pair and accuracy values individual to said pair.

6. The measurement configuration according to claim 5, wherein said evaluation facility regards the plausibility check as failed and generates the error signal if, in a case of at least one said pair, an amount of a quotient between the deviation value individual to said pair and the accuracy value individual to said pair attains or overshoots a deviation value-based limit value individual to said pair or a system-wide deviation value-based limit value.

7. The measurement configuration according to claim 1, further comprising:
an antenna, wherein said measurement facilities are connected to a same said antenna, use said same antenna jointly or individual; or
antennas, all said measurement facilities are in each case connected to an individually assigned one of said antennas and use antenna signals of said individually assigned antenna.

8. The measurement configuration according to claim 1, further comprising:
a computing facility; and
a memory storing software, said software, which when executed by said computing facility defines a mode of operation of said computing facility and said evaluation facility and said measurement facilities are formed by software program modules of said software.

9. The measurement configuration according to claim 2, wherein distances between said measurement facilities are taken into account when calculating further deviation values in that the further deviation values are corrected by taking into account the distances.

10. A vehicle, comprising:
said measurement configuration according to claim 1.

11. The vehicle according to claim 10, further comprising a vehicle controller, which, when the error signal is present, checks whether a speed of the vehicle has to be reduced or the vehicle has to be stopped.

12. The vehicle according to claim 10, further comprising a vehicle controller, which, when the error signal is present, reduces a speed of the vehicle or stops the vehicle.

13. The vehicle according to claim 10, wherein the vehicle is a rail vehicle.

14. A method, which comprises the steps of:
generating a first measured value indicating a location or a speed of a first satellite-based measurement facility, and generating a measured value-based first accuracy value indicating an accuracy of the first measured value, with an aid of the first satellite-based measurement facility working on a basis of signals of a first global satellite positioning system;
generating a second measured value indicating a location or a speed of at least a second satellite-based measurement facility, and a second measured value-based accuracy value indicating an accuracy of the second measured value, with an aid of at least the second satellite-based measurement facility working on a basis of signals of a second, different global satellite positioning system;
generating a third measured value indicating a location or a speed of at least one third measurement facility, and a third measured value-based accuracy value indicating an accuracy of the third measured value;
determining a deviation value, which quantifies a deviation of the measured values from an estimated measured value, the estimated measured value being estimated on a basis of the measured values, to form an accuracy value indicating an accuracy of deviation values, hereinafter referred to as a deviation value-based accuracy value;
carrying out a plausibility check, and an error signal is generated if the plausibility check delivers an implausible result and is regarded as failed and to generate the error signal using the deviation values and the deviation value-based accuracy value.

* * * * *